United States Patent [19]

Mallavarapu

[11] 3,787,347
[45] Jan. 22, 1974

[54] NOVEL RESINOUS COMPOSITIONS AND METHOD FOR PRODUCING SAME

[75] Inventor: Leo X. Mallavarapu, Suffern, N.Y.

[73] Assignee: Reichhold Chemicals, Inc., White Plains, N.Y.

[22] Filed: Feb. 18, 1972

[21] Appl. No.: 227,656

[52] U.S. Cl. .............. 260/30.4 EP, 260/32.8 EP, 360/33.8 EP, 260/37 EP
[51] Int. Cl... C08g 51/26, C08g 51/34, C08g 51/30
[58] Field of Search .... 260/47 EN, 31.4 EP, 47 CB, 260/33.6 EP, 32.8 EP

[56] References Cited
UNITED STATES PATENTS

| | | | |
|---|---|---|---|
| 3,538,039 | 11/1970 | Lantz et al. | 260/47 EN X |
| 3,454,421 | 7/1969 | Westbrook | 260/47 EN X |
| 3,321,548 | 5/1967 | Sattler | 260/47 EN X |
| 3,367,991 | 2/1968 | Hicks | 260/47 EN X |

*Primary Examiner*—Lewis T. Jacobs
*Attorney, Agent, or Firm*—Munson H. Lane et al.

[57] ABSTRACT

This invention relates to certain novel curable resinous compositions of matter comprising (A) an organic polyepoxide having a molecular weight ranging from about 1000–2000 and (B) a primary or secondary amine containing hydroxyl groups and a method for producing the same. These resinous compositions of matter may be cured into useful protective coatings at low ambient temperatures through the use of polyisocyanates as curing agents.

4 Claims, No Drawings

NOVEL RESINOUS COMPOSITIONS AND METHOD FOR PRODUCING SAME

This invention discloses certain novel curable resinous compositions of matter and a method for producing the same. These resinous compositions of matter may be cured into tough, chemical resistant, protective coatings at low ambient temperatures through the use of polyisocyanates as curing agents. Compositions contemplated by instant invention comprise reacting (A) a polyepoxide of molecular weight 1000–2000 and (B) a primary or secondary amine containing hydroxyl groups to yield a curable resinous material.

There has been great interest in developing resinous products which could be cured at low ambient temperatures in reasonable lengths of time. Much attention has been paid to basing these resinous products upon epoxy or modified epoxy systems. This is because the polymerized 4,4'-isopropylidenediphenol-epichlorohydrin backbone of the epoxy resin system lends excellent properties to a finished coating. Such properties include good adhesion, excellent resistance to chemicals including water, good flexibility and impact resistance as well as good abrasion resistance. Low temperature curable coatings prepared from modified or unmodified epoxy systems are of particular importance in the marine field and in the building trades in temperate climates during the cold months. To date, very little progress has been made in this area and in fact no commercial epoxy based systems are said to perform satisfactorily for low temperature applications.

Several studies have been conducted which elaborate on the accelerating effects of alcohols, phenols and primary amines, tertiary amines and sulfur containing compounds on the rate of oxirane group-amine reaction. However, those skilled in the art generally agree that none of these resins meet the design critique; ie: low temperature curable epoxy based resinous compositions. Greenlee et al,[1] (1. "Thioalkanoic Acids as Epoxy Curing Agents," S. O. Greenlee, G. J. Crocker and C. L. Weidner, J. Paint Technol. 42, 31 (1970)) have presented evidence to show that thioalkanoic acids are satisfactory room temperature curing agents for straight epoxy resins. Among the drawbacks to this approach is the odor of the sulfur compounds utilized and relatively poor film properties when cured at lower temperatures. Similar problems exist with the use of catalyzed polymercaptans as low temperature curing agents. Though mercaptan curing agents are highly reactive with epoxy resins even at very low temperatures the final coating suffers from odor, poor adhesion and other mediocre film properties as well as high cost.

The use of polyisocyanates to cure straight epoxy resins is known to the art; the curing taking place by reaction between the isocyanate groups and the secondary hydroxyl groups present in the high molecular weight epoxy resin. One of the major drawbacks to this approach is that the consumption of the hydroxyl groups during the curing process leads to poor adhesion with resultant film failure as well as brittleness. High molecular weight epoxy resins are required to provide the necessary hydroxyl functionality which means, that the solids content of the coating system has necessarily to be kept low, resulting in additional poor adhesion problems, and the like. It has been demonstrated that an isocyanate group does not react with an epoxy group except at elevated temperatures (160° C) with n-butoxylithium as a catalyst and o-dichlorobenzene as a solvent.[2],[3] (2. R. R. Dileone, J. Polym. Chem. 8, 609 (1970)) (3. J. E. Herweh and W. Y. Whitmore, J. Polym. Chem. 8, 2759 (1970)) Thus, with a polyisocyanate secondary hydroxyl group in the backbone are used up leaving the epoxy groups largely untouched.

It is, therefore, an object of this invention to provide novel curable resinous compositions of matter which may be cured at low ambient temperatures.

Another object of this invention is to prepare novel, curable, resinous compositions of matter based upon a modified epoxy resin which may be cured at low ambient temperatures by polyisocyanates while retaining excellent film properties.

Further objects and the entire scope of applicability of the present invention will become apparent from the detailed specification and examples given hereinafter; it should be understood, however, that the detailed and specific examples while indicating preferred embodiments of the invention are given by way of illustration only, since various changes and modifications within the spirit and scope of the invention will become apparent to those skilled in the art.

It has now been found that these and other objects may be achieved by preparing curable resinous compositions comprising (A) an organic polyepoxide and (B) an amine selected from a group consisting of primary and secondary amines containing hydroxyl groups. They may be cured by isocyanates at low temperatures. The reaction of the OH containing amine component (B) with the epoxy component (A) converts the terminal epoxy groups (which are non-reactive to isocyanates at low temperatures) to hydroxyl bearing groups which react relatively fast with isocyanates at low (about 0° C) temperatures.

These novel compositions may be formulated into coatings which cure at low ambient temperatures through the use of a polyisocyanate as a curing agent.

It is important to note that this rapid reaction of isocyanate-OH takes place not only when the substrate is cold but also when the coating composition itself is cold. That is, it is not necessary to maintain the coating composition at an elevated temperature during the coating operation.

The curable resinous compositions of instant invention may be prepared generally by charging an organic polyepoxide and a primary or secondary amine containing hydroxyl groups into a suitably equipped resin flask. The temperature is rapidly raised to about 175° C under an inert gas atmosphere and with agitation. These reaction conditions are maintained for a period of time ranging from about 2 to 3 hours. At the end of this time the product is removed and allowed to cool.

A protective coating may be prepared directly from this product by dissolving in a suitable solvent and adding an isocyanate and allowing to cure. Finished films have good adhesion, excellent resistance to water and chemicals, possess good abrasion resistance as well as excellent flexibility and impact resistance. Typical coating formulations and their properties are illustrated in Example XXII.

Organic polyepoxide compounds suitable for the practice of this invention comprise those resinous epoxies obtain by the reaction of 4,4'-isopropylidenediphenol with epichlorohydrin. The preparation of these epoxy resins is widely known and practiced in the art. The molecular weight for the polyepoxy, component A, may range from about 340 to about 4000 or higher; the limiting factor being that the polyepoxide should be fluid enough at the reaction temperature to insure complete mixing and reaction. Preferably the molecular weight should range from about 1000–2000 because subsequent coatings show superior performance properties.

Component B may be selected from a wide range of primary and secondary amines preferably those bearing hydroxyl groups. These include diethanol amine, diisopropanol amine, n-methyl-ethanol amine, n-aminoethylethanol amine, mono-isopropanol amine, diethylenetriamine, triethylene tetramine, tetraethylene pentamine, propylene diamine, 1,3 diamino propane, aminobispropyl amine, n-hydroxyethyldiethylene triamine, n-aminoethyl piperazine and the like and mixtures thereof. The preferred amines are diethanol amine or diisopropanolamine, n-aminoethyl ethanolamine and n-aminoethyl piperazine because of the outstanding results obtained therewith.

Reaction conditions may vary greatly as to time and temperature. The lowest reaction temperature is determined by the melting point of the epoxy resin and its fluidity at that temperature. For instance, an epoxy having a molecular weight of about 360 is a viscous liquid at room temperature and a reaction temperature of about 50° C is therefore possible. However, the reaction would proceed very slowly and for practical purposes a lower temperature range of about 100° C is preferred. At a temperature above 195° C the compositions of this invention begin to degrade and therefore this is considered to be the practical upper temperature range. The reaction time is influenced by the temperature such that at higher reaction temperatures a shorter period of reaction is required. Therefore, within the preferred reaction temperatures the time of reaction may range from about 3 hours at the lower temperatures to about 1 hour at higher temperatures. At a reaction temperature of about 175° C 2.5 hours is needed to yield the desired product; this being the preferred time and temperature of the reaction.

Preferably, this reaction is run under an inert gas atomsphere such as nitrogen or carbon dioxide but this is not essential.

These novel, curable, resinous compositions of matter as heretofore described are readily curable at temperatures as low as about 0° C through the use of an isocyanate as a curing agent. If an isocyanate having up to two NCO groups is used as the curing agent, a film is produced having mediocre properties. Whereas a polyisocyanate curing agent produces a hard, tough film having excellent physical properties. Since many of the products of this invention are solids at room temperature they must be first dissolved in a suitable solvent before the curing agent is added.

Isocyanate curing agents which function as low temperature curing agents for the curable resinous compositions of matter of this invention may be selected from a group including toluene diisocyanate-neopentyl glycol adduct, toluene diisocyanate-pentaerythritol adduct, toluene diisocyanate-trimethylol propane, toluene diisocyanate-glycerol adduct, isophorone diisocyanate-pentaerythritol adduct, isophoronediisocyanate-neopentyl glycol adduct, isophorone diisocyanate-glycerol adduct, polymethylene polyphenylisocyanate-neopentyl adduct, polymethylene polyphenylisocyanate-pentaerythritol adduct, polymethylene polyphenylisocyanate-glycerol adduct, toluene diisocyanate, isophorone diisocyanate and polymethylene polyphenylisocyanate and the like.

However, excellent results have been obtained through use of the reaction product of toluene diisocyanate and trimethylol propane as the curing agent and this is preferred. The amount of curing agent employed may be based upon the number of mols of resin used. Depending upon the NCO content of the curing agent, the mol ratio of resin to curing agent may range from about 1:1 to about 1:4. The preferred mol ratio of resin to curing agent is about 1:2.5.

Solvent may be added to the curing agent to facilitate mixing of the resin but is not essential. Excellent coating formulations based upon the novel curable resinous compositions of instant invention may be prepared utilizing the various fillers, pigments, solvents and other additives known to those skilled in the art.

For example, it has been found that fillers such as talcum, clays, carbonates, asbestos powder, quartz powder, chalk, dolomite, kieselguhr, heavy spar and mixtures thereof may be used.

For coloring the mixtures according to the present invention, it is possible to use dyes and/or inorganic pigments. An illustrative digest of pigments suitable for this purpose are set forth for example in Organic Protective Coatings, Reinhold Publishing Corp. 1953, pages 155–166 inclusive.

In addition, flow control agents, accelerators such as triethylamine and dibutyltin dilaurate and the like may be compounded into the coating formula.

A large variety of solvents may be used for the resin and for coatings including diacetone alcohol, methylisobutyl ketone, methylethylketone, dioxane and methylene chloride and mixtures thereof. It has been found that a mixture of dioxane and methyl isbutyl ketone, 50/50 by weight performs satisfactorily.

The invention will be more readily understood by reference to the accompanying specific examples which are intended as illustrative only rather than as limiting the invention except as defined in the accompanying claims.

Preparation of Curable Resinous Compositions

EXAMPLE I

Into a two liter resin flask fitted with a means for stirring, thermometer, inert gas inlet, reflux condenser and heating mantle was charged 1,000 grams of a 4,4-isopropyl-idenediphenol-epichlorohydrin epoxy resin having an average molecular weight ranging from about 1,750 to 2,000 and 120 grams of diethanolamine. The temperature was raised to 175° C with stirring under a nitrogen atmosphere. These reaction conditions were maintained for 2.5 hours at the end of which the resinous product was poured into a shallow tray and allowed to cool into a hard mass.

EXAMPLE II

In the following Examples both the reactants and the reaction conditions were varied while using a reaction setup as described in Example I. The epoxy resin used in each instance was a 4,4-isopropylidene-epichlorohydrin type of different average molecular weight.

TABLE I

| Epoxy Mol Wt. (Approximate) | No. Grams Epoxy | Amine | No. Grams Amine | Reaction Temp. °C | Reaction Time/Hrs. | Example No. |
|---|---|---|---|---|---|---|
| 360–390 | 390 | diisopropanol amine | 280 | 190° | 1.5 | II |
| 360–390 | 390 | isopropanol amine | 165 | 100° | 3.0 | III |
| 900–1050 | 1000 | diethanol amine | 230 | 175° | 2.5 | IV |
| 900–1050 | 1000 | n-hydroxyethyl diethylene triamine | 325 | 175° | 2.0 | V |
| 1125–1450 | 1500 | diethylene triamine | 227 | 175° | 2.5 | VI |
| 1750–2000 | 2000 | diisopropanol amine | 280 | 175° | 2.5 | VII |
| 1750–2000 | 2000 | n-hydroxyethyl diethylene triamine | 325 | 175° | 2.5 | VIII |
| 1750–2000 | 2000 | n-aminoethyl ethanolamine | 228 | 175° | 2.5 | IX |
| 1750–2000 | 2000 | diethylene triamine | 227 | 175° | 2.5 | X |
| 1750–2000 | 2000 | propylene diamine | 165 | 175° | 2.5 | XI |
| 1750–2000 | 2000 | n-amino ethylethanol amine | 230 | 175° | 1.5 | XII |
| 1750–2000 | 2000 | n-amino-ethyl-piperazine | 286 | 175° | 2.5 | XIII |
| 1750–2000 | 2000 | tetraethylene pentamine | 418 | 175° | 2.5 | XIV |
| 1750–2000 | 2000 | triethylene tetramine | 321 | 175° | 2.5 | XV |
| 1750–2000 | 2000 | isopropanol amine | 165 | 175° | 2.5 | XVI |
| 1750–2000 | 2000 | diethanol amine | 230 | 175° | 1.0 | XVII |
| 3100–4000 | 340 | diethanol amine | 115 | 190° | 3.0 | XVIII |
| 340 | 340 | diethanol amine | 230 | 150° | 2.5 | XIX |

PREPARATION OF CURING AGENT

EXAMPLE XX

The preferred curing agent was prepared by changing 134 grams trimethylol propane, 525 grams toluene diisocyanate and 300 grams of urethane grade ethyl acetate into a two liter flask filled with a condenser, stirrer, reflux condenser, thermometer, inert gas inlet and heating mantle. The temperature was increased to 55° C under a nitrogen blanket with stirring. These reaction conditions were maintained for 6 hours at which time the light yellow viscous solution was poured into a container and sealed under nitrogen.

Preparation of Coatings from Resins Prepared According to Examples I XIX

EXAMPLE XXI

A low temperature curing coating was prepared as follows:

| | |
|---|---|
| Resin from Example I | 1060 grams |
| Dioxane | 800 grams |
| MIBK | 800 grams |

The resin was broken into lumps and added to the dioxane with stirring and heat to hasten solution. To this solution was added the 800 grams of MIBK with stirring to obtain a 40 percent N.V. solution.

The trimethylol propane-toluenediisocyanate adduct prepared according to Example XX was diluted to 40 percent N.V. using dioxane.

266 grams of the resin solution and 56 grams of the curing agent solution were separately cooled down to 0°–5° C by packing the containers in ice, and leaving them in the cold room (temperature 6°–8° C) overnight, and again packing the containers in ice for two hours.

Just prior to spraying, the two ingredients were mixed and stirred to a homogeneous solution. This solution was sprayed onto Parker EP-1[4] (4. These panels are available from Hooker Chemical Co., Parker Division, Detroit, Michigan.) panels.

Parker EP-1 panels are steel panels with a microcystalline zinc phosphate surface, which would, for screening purposes, approximate the type of substrate encountered for marine coatings use.

Panels were set up in the spray booth, and the mixture sprayed evenly on the panels, and the panels immediately transferred to the cold room and allowed to cure at 6°–8° C. (The panels were not precooled in the cold room before spraying, in order to avoid formation of a moisture film on the panels when exposed to room temperature humidity).

The curing of the panels was followed every few minutes. They were dry to touch in approximately 25 minutes. Panels were cured overnight at 6°–8° C and the development of solvent resistance was followed by testing a spot on the panels with drops of MIBK, allowing to stand for a few seconds, and then attempting to scratch the film. The panels withstood this test after approximately 24 hours in the cold room.

Preliminary tests for adhesion by making a cut in the film with a sharp instrument and attempting to remove it from adhesive tape made no change in the film, indicating satisfactory adhesion. Also when the panels were subjected to the bend test, no signs of film cracking or weakness were observed.

EXAMPLE XXII

Coatings were prepared and evaluated as outlined in Example XXI except that the resin and the type and amount of curing agent were changed. The levels of resin to curing agent were based upon resin solids.

| Resin According To Example No. | mols resin | Curing Agent | mols curing Agent | Physical Properties* |
|---|---|---|---|---|
| IX | 1 | TDI-neopentyglycol | 1 | A |
| XVII | 1 | TDI-neopentyglycol | 1 | A |
| VII | 1 | TDI-TMP | 1.2 | A |
| IV | 1 | TDI-TMP | 4 | A |
| II | 1 | TDI | 3 | B |
| XIII | 1 | TDI-TMP | 2.2 | A |
| XVI | 1 | TDI-TMP | 2.2 | A |
| I | 1 | TDI-pentaerythrital | 1.8 | A |
| I | 1 | TDI-glycerol | 2.3 | A |

A— acceptable
B— unacceptable
TDI— toluene diisocyanate
TMP— trimethylol propane

EXAMPLE XXIII

In order to completely evaluate the resins of this invention for use in marine and similar low temperature coating applications the following two component grey hull enamel was formulated and evaluated as follows:

| Formulation | Lbs/350 gallons |
|---|---|
| COMPONENT -A: | |
| Epoxy according to Example I (Solids) | 600.0 |
| Dioxane | 450.0 |
| MIBK | 450.0 |
| Talc | 345.0 |
| Calcium carbonate | 285.0 |
| Titanian dioxide | 172.5 |
| Carbon Black | 11.25 |

Grind 16 hours in steel ball mill to fineness 6+N.S. and add:

| | |
|---|---|
| Dioxane | 225.0 |
| MIBK | 225.0 |
| Pounds per gallon = 10.258 | 2,763.75 = 269.4 gals. |

Procedure: epoxy solids, two-thirds of solvent and all the pigment were added to a steel ball mill, ground for 16 hrs. or to a fineness of 6+N.S. Balance of solvent was added and mixed for 15 minutes.

| COMPONENT -B: | |
|---|---|
| Curing agent according to Example XX at 75% N.V. | 176.0 |
| Dioxane | 154.0 |
| Pounds per gallon = 9.269 | 330.0 = 35.6 gal. |

| Admixed Enamel OH/NCO — 2:1 | Pounds | Gallons |
|---|---|---|
| COMPONENT — A (Epoxy) | 2,764.0 | 269.4 |
| COMPONENT — B (Curing Adduct) | 330.0 | 35.6 |
| Pounds per Gallon = 10.144 | 3,094.0 | 305.0 |

The results of the evaluation are presented in the following tables.

TABLE II

ADMIXED GRAY HULL ENAMEL

| | |
|---|---|
| OH/NCO Ratio | 2:1 |
| Total Solids (percent by weight of enamel) | 49.9 |
| Non-Volatile Vehicle (percent by weight of vehicle) | 32.1 |
| Viscosity No. 4 Ford Cup (seconds at 5°C) | 70.0 |
| Viscosity (Stormer) (Krebs Units at 5°C) | 68.0 |
| Dry Film Thickness (.004 inch wet film on Bonderite 100) (mils) | 1.15 |

Cure time at 5°C -

| | |
|---|---|
| Set-to-touch (minutes) | 15.0 |
| Tack free (hours) (to paper) | 2.5 |
| Reduced Viscosity No. 4 Ford Cup (seconds) | |
| 4 parts Enamel, 1 part Dioxane by volume | 24.0 |
| Spraying Properties at reduced viscosity using (siphon type gun) (freshly mixed enamel) | very good |
| Recoatability — At 2-½ hrs. curing at 5°C | very good |
| — At 22 hrs. curing at 5°C | very good |
| Pot Life at 5°C | 5 hours |

Application Procedure

Parker bonderite 100* panels coated with (draw down 4 mils wet film) the hull enamel containing primary OH/NCO ratio of 2:1.
The gray hull enamel and curing adduct were separately cooled down to 0-5°C in a regrigerator overnight.
Just prior to conducting experiments, the two components were mixed and packed in ice to maintain a temperature of 5°C for application.
Application by drawdown blade and spray-gun were made over precooled panels and stored in regrigerator maintained at a temperature of 5°C for curing times of 3, 7 and 14 days.

Baked films were stored overnight at a temperature of 5°C, then baked for one hour at 320°F.
*These panels are available from Hooker Chemical Co., Parker Division, Michigan. Parker Bonderite 100 panels are zinc phosphated cold rolled steel plates 4 inches × 12 inches.

TABLE III

Application with draw-down blade at 4 mils film (wet)

| Curing Time: | 3 days | 7 days | 14 days | Baked |
|---|---|---|---|---|
| Curing Temperature | 5°C | 5°C | 5°C | 1 hr at 320°F |
| Dry film thickness (mils) | 1.3 | 1.3 | 1.2 | 1.15 |
| Pencil hardness | <3B-0 | 3B-2B-1 | 3B-2B-1 | >6H->10 |
| Adhesion (cross hatch) (tape) | excellent | excellent | excellent | excellent |
| Flexibility (conical madrel) | excellent | excellent | excellent | cracking ¾" from end |
| Resistance Properties: | | | | |
| Dioxane (5 minutes) | softens, recovers 2 hrs. | softens, recovers 2 hrs. | softens, recovers 2 hrs. | softens, recovers 2 hrs. |
| MIBK (5 min.) | no effect | no effect | no effect | no effect |
| 20% NaOH (60 min.) | no effect | no effect | no effect | no effect |
| 50% NaOH (60 min.) | no effect | no effect | no effect | no effect |
| Impact: Direct (in.-lbs.) | >110 | >110 | >120 | >40<50 |
| Impact: Reverse (in.-lbs.) | >70 | >80<90 | >80<90 | >4<8 |

TABLE III

| Curing Time: | Application with draw-down blade at 4 mils film (wet) | | | |
|---|---|---|---|---|
| | 3 days | 7 days | 14 days | Baked |
| Abrasion (Falling sand) (liters) | >105<110 | >90<95 | >80<85 | >60<65 |

| | Water Resistance (7 days immersion) Film Tested 1 hour after removal | | | |
|---|---|---|---|---|
| Cure Time: | 3 days | 7 days | 14 days | Baked |
| Above Water Line: | | | | |
| Knife Test | Ribbons | Ribbons | Ribbons | Ribbons |
| Pencil Hardness | F-H-5 | F-H-5 | F-H-5 | >6H->10 |
| Adhesion (cross hatch) (tape) | excellent | excellent | excellent | excellent |
| Blushing | sl. -cons. | sl. -cons. | sl. cons. | none |
| Chalking | none | none | none | none |
| Blistering | none | none | none | none |
| Below Water Line: | | | | |
| Knife Test | Ribbons | Ribbons | Ribbons | Ribbons |
| Pencil Hardness | B-HB-3 | B-HB-3 | B-HB-3 | 6H-10 |
| Adhesion (cross hatch) (tape) | excellent | excellent | excellent | excellent |
| Blushing | severe | severe | severe | none |
| Chalking | none | none | none | none |
| Blistering | none | none | none | none |

| | Weatherometer Resistance (films checked immediately after removal) | | | | | | | |
|---|---|---|---|---|---|---|---|---|
| Cure Time: | 3 days | | 7 days | | 14 days | | Baked | |
| | Film | Gloss | Film | Gloss | Film | Gloss | Film | Gloss |
| Initial Gloss | | 26 | | 25 | | 25 | | 5 |
| Exposure | | | | | | | | |
| 100 hr. | Good | 23 | Good | 20 | Good | 16 | Good | 5 |
| 200 hr. | Blushing | 16 | Blushing | 10 | Blushing | 14 | Blushing | 2 |
| 300 hr. | " | 3 | " | 2 | " | 3 | " | 1 |
| 400 hr. | " | 1 | " | 1 | — | — | " | 1 |

TABLE IV

| | LOW TEMPERATURE GRAY HULL ENAMEL Application by Spraying, one wet coat | | | |
|---|---|---|---|---|
| Cure Time: | 3 days | 7 days | 14 days | Baked |
| Curing temperature | 5°C | 5°C | 5°C | 1 hr at 320°F |
| Dry film thickness (mils) | 1.5 | 1.5 | 1.6 | 1.5 |
| Pencil hardness | <3B-0 | <3B-0 | 3B-2B-1 | >6H->10 |
| Adhesion (cross hatch) (tape) | excellent | excellent | excellent | excellent |
| Flexibility (conical mandrel) | excellent | excellent | excellent | 1-½ inch cracking |
| Resistance Properties: | 3 days | 7 days | 14 days | Baked |
| Dioxane (5 min.) | softens, recovers 2 hrs. | softens, recovers 2 hrs. | softens, recovers 2 hrs. | softens, recovers 2 hrs. |
| MIBK (5 min.) | no effect | no effect | no effect | no effect |
| 20% NaOH (60 min.) | no effect | no effect | no effect | no effect |
| 50% NaOH (60 min.) | no effect | no effect | no effect | no effect |
| Impact: Direct (in.-lbs.) | >110 | >120 | >100-<110 | >30-<40 |
| Impact: Reverse (in.-lbs.) | >80 | >60-<70 | >30-<40 | <4 |
| Abrasion (Falling Sand) (Liters) | >135-<140 | >125-<130 | >130-<135 | >75-<80 |

TABLE IV

LOW TEMPERATURE GRAY HULL ENAMEL
Application by Spraying, one wet coat

| Cure Time: | 3 days | 7 days | 14 days | Baked |
|---|---|---|---|---|

Water Resistance (7 days immersion)
Film Tested One Hour After Removal

| Cure Time: | 3 days | 7 days | 14 days | Baked |
|---|---|---|---|---|
| Above Water Line: | | | | |
| Knife Test | Ribbons | Ribbons | Ribbons | Ribbons |
| Pencil Hardness | B-HB-3 | B-HB-3 | B-HB-3 | >6H->10 |
| Adhesion (cross hatch) (tape) | excellent | excellent | excellent | excellent |
| Blushing | sl.-cons. | sl.-cons. | sl.-cons. | none |
| Chalking | none | none | none | none |
| Blistering | considerable | considerable | considerable | none |
| Below water Line: | | | | |
| Knife Test | Ribbons | Ribbons | Ribbons | Ribbons |
| Pencil Hardness | <3B-0 | <3B-0 | <3B-0 | >6H->10 |
| Adhesion (cross hatch) (tape) | excellent | excellent | excellent | excellent |
| Blushing | severe | severe | severe | v. slight |
| Chalking | none | none | none | none |
| Blistering | none | none | none | none |

Weatherometer Resistance
(films checked immediately after removal)

| Cure Time: | 3 days | | 7 days | | 14 days | | Baked | |
|---|---|---|---|---|---|---|---|---|
| | Film | Gloss | Film | Gloss | Film | Gloss | Film | Gloss |
| Initial Gloss | | 26 | | 25 | | 25 | | 5 |
| Exposure | | | | | | | | |
| 100 hr. | Good | 22 | Good | 14 | Good | 13 | Good | 5 |
| 200 hr. | Blushing | 10 | Blushing | 10 | Blushing | 13 | Blushing | 2 |
| 300 hr. | " | 2 | — | — | — | — | " | 1 |

What is claimed is:

1. An epoxy composition produced by reacting (I) the reaction product of (A) 4,4'isopropylidene diphenolepichlorohydrin epoxy resin having a molecular weight ranging from about 1,000 to about 2,000 and (B) an amine selected from the group consisting of diethanol amine, diisopropanol amine, n-aminoethyl piperazine and n-aminoethyl ethanol amine and (II) a curing agent for (I) consisting of the toluene diisocyanate adduct of a polyol selected from the group consisting of trimethylol propane, pentaerythritol and glycerol in the presence of (III) a solvent for (I) and (II) which is at least one member selected from the group consisting of dioxane, methylene chloride and methyl isobutyl ketone and wherein the mole ratio of (I) to (II) ranges from 1:1 to about 1:4.

2. The composition according to claim 1 wherein the mol ratio of (I) to (II) is about 1:2.5.

3. The compositions according to claim 1 wherein fillers and pigments are added.

4. The compositions according to claim 1 wherein the amount of fillers and pigments added range up to about 200 parts by weight for each 100 parts by weight by (I) and (II) used.

* * * * *